(12) United States Patent
Walker

(10) Patent No.: US 8,041,727 B2
(45) Date of Patent: Oct. 18, 2011

(54) SYSTEM, METHOD, AND COMPUTER PROGRAM PRODUCT FOR FINDING WEB SERVICES USING EXAMPLE QUERIES

(75) Inventor: Alan Walker, Southlake, TX (US)

(73) Assignee: Sabre Inc., Southlake, TX (US)

( * ) Notice: Subject to any disclaimer, the term of this patent is extended or adjusted under 35 U.S.C. 154(b) by 1099 days.

(21) Appl. No.: 11/030,463

(22) Filed: Jan. 6, 2005

(65) Prior Publication Data

US 2006/0149756 A1    Jul. 6, 2006

(51) Int. Cl.
*G06F 17/30* (2006.01)

(52) U.S. Cl. ........................................ 707/765; 707/780

(58) Field of Classification Search .................... 707/765
See application file for complete search history.

(56) References Cited

U.S. PATENT DOCUMENTS 6,711,585 B1 * 3/2004 Copperman et al. ....... 707/104.1

OTHER PUBLICATIONS

The International Search Report and Written Opinion for International Application No. PCT/US2006/000068, completed Jun. 18, 2008, mailed Jul. 7, 2008.

Metais, Elizabeth, "Enhancing Information Systems Management with Natural Language Processing Techniques," *Data and Knowledge Engineering*, vol. 41, 2002, pp. 247-272.

The Supplementary European Search Report from European Patent Appl. No. 06717293.2, mailed May 18, 2010.

* cited by examiner

*Primary Examiner* — Charles Rones
*Assistant Examiner* — Mellissa M Chojnacki
(74) *Attorney, Agent, or Firm* — Alston & Bird LLP

(57) ABSTRACT

A system, method, and computer program product allows a web service consumer to create an example query which illustrates the web service desired. The example query is compared, element by element, to potentially relevant web services. The difference between each element in the example query and any element in the web service being compared is quantified as a distance metric, based on the relationship between the elements. The relationships might be classified as: exact match, direct synonym, fuzzy synonym, hyponym, hypernym, or no match. The distance metric for each element in the example query is summed to calculate a total distance between the example query and the web service being compared. This sum is an expression of the difference between the example query and the web service being compared.

36 Claims, 6 Drawing Sheets

SYSTEM, METHOD, AND COMPUTER PROGRAM PRODUCT FOR FINDING WEB SERVICES USING EXAMPLE QUERIES

FIELD OF THE INVENTION

The present invention relates generally to web services, and more particularly, to locating web services by creating an example query and quantifying the difference between the example and available web services.

BACKGROUND OF THE INVENTION

In a web service-oriented architecture, web services make software functionality available over the Internet so that computer programs can make a request to a program running on another server (a web service) and use that program's response in a website or other application.

The web service provider defines a format for requests for its web service and the response the web service will generate. The web service consumer makes a request for the web service over the Internet. The web service then performs some action and sends a response back. The action performed by the web service might be, for example, finding the availability and price of an airline flight or retrieving a stock quote.

Communication between the web service provider and the web service consumer may be accomplished using extensible mark-up language (XML). In order for a web service consumer to request and receive information from a web service provider, the web service consumer must use an XML query that employs the same data type definitions as those employed by the web service provider. These definitions, called an XML schema, are usually based on a vocabulary established and agreed upon in advance. This agreement can be within an organization or between organizations, such as within an industry. Many industries have created industry-specific XML schema to facilitate interoperability of web services within each industry. For example, there are industry-specific schema for the accounting, education, and manufacturing industries, to name just a few. Additionally, schema may be described using Web Services Description Language (WSDL).

In addition to using the same data type definitions, the XML query used by the web service consumer must use the same corresponding structural levels as used by the web service provider. The required matching data type definitions must be located on the same structural level in both the XML query and the web service.

One problem with XML schema, even within an industry, is that competition, progress, new standards, and differing needs mean that global standards for even the simplest web services are unlikely. One example of this is travel reservation industry. The major Global Distribution Systems (GDS), such as Sabre, Amadeus, Worldspan, and Galileo, have each created their own XML standards. When referring to an airline on which a flight is available, one GDS may use the term "airline" while another GDS may use the term "carrier." An XML query written using "carrier" would not be successful in requesting information from the GDS which uses "airline."

The web service consumer must identify which web service provider can provide the necessary web service, and also identify the schema used by the specific web service provider. Current service discovery schemes rely on a name and keyword-based characterstics. Examples include Universal Description, Discovery, and Integration (UDDI), Java's Jini protocol, and CORBA Trading Service. Due to the large number of web services available and the numerous sources of information regarding the web services, it can be difficult to identify the desired web service and its associated schema.

Once the desired web service is identified, the web service consumer must then create an XML query using the precise schema on the precise structural levels as demanded by the web service provider. If the XML query does not exactly match the schema and structural levels, then it will not be successful.

As such, there is a need for a system, method, and computer program product capable of facilitating the use of web services by simplifying the process of locating and communicating with web services.

BRIEF SUMMARY OF THE INVENTION

A system, method, and computer program product are therefore provided that allows a web service consumer to create an example XML query which is illustrative of the web service desired such that web services that may satisfy the requirements of the web service consumer can be identified by quantifying the difference between the example query and the XML schema used by the web services. Where the quantified difference is small, this system and method may translate the example query into a query using the XML schema required by the web service The example query created by the web service consumer may be compared to potentially relevant web services, one web service at a time. The comparison of the example query to each potentially relevant web service may be conducted element by element and level by level. The difference between each element in the example query and any element in the web service being compared is quantified as a distance metric. The distance metric is therefore a measure of the similarity or difference between the element of the example query and the corresponding element of the web service under review. In one embodiment, this distance metric for each element varies, and is based on: (1) whether there is an exact match between the element in the example query and an element in the web service being compared; (2) whether an element in the web service being compared is a direct synonym of the element in the example query; (3) whether an element in the web service being compared has a field type conversion of the element in the example query; (4) whether an element in the web service being compared is a fuzzy synonym of the element in the example query; (5) whether an element in the web service being compared is a hyponym, hypernym, or holonym of the element in the example query; or (6) whether there is no match in the web service being compared for the element in the example query. The distance metric for each element in the example query is summed to calculate a total distance between the example query and the web service being compared. This sum is an expression of the difference between the example query and the web service being compared.

Once the distance between the example query and the potentially relevant web services is computed, the potentially relevant web services can be ranked by distance such that the web service with the smallest distance is the closest match to the example query. In other words, the smaller the distance the more likely the web service will meet the requirements of the web service consumer.

In one embodiment of the invention, the web service consumer chooses the web service with the smallest distance. The web service consumer then manually rewrites the XML query to exactly match the schema used by the chosen web service. In another embodiment, the system and method of the present invention automatically rewrites the example query to match the schema used by the web service that is the closest match. In another embodiment of the invention, the example query is automatically rewritten only if the chosen web service is the closest match to the example query, and the comparison between the example query and the chosen web service only identified exact matches or direct synonyms. Where the example query is to be automatically rewritten, this may be facilitated by storing the details of each comparison as it is made. As such, the present invention would know, element by element and level by level, exactly what changes would need to be made to the example query to make it match the schema used by the chosen web service without conducting the comparison a second time.

In any of these embodiments, the system, method, and computer program product of the claimed invention facilitate a user's access and use of web services even though the user does not know the XML schema employed by the web service.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
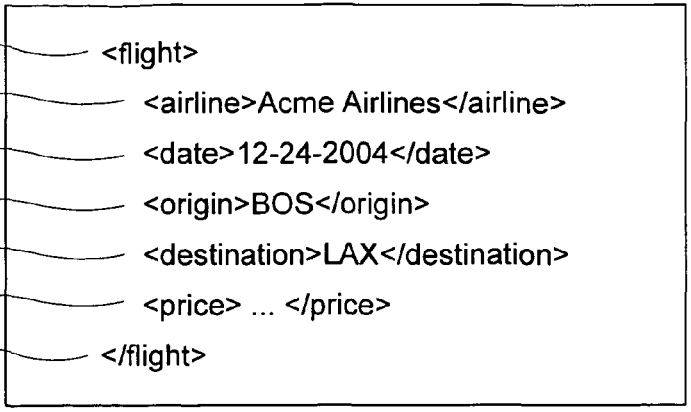
FIG. 1 is an illustration of an example query.

FIG. 1 illustrates an example query 10, written in XML, according to one embodiment of the invention. XML is used for purposes of example, although the query could be presented in other computer programming languages and with other schemas if so desired. A user of the present invention might create example query 10 to search for web services that provide data on airline flights. However, the query could be differently formulated to search for other web services without departing from the spirit and scope of the present invention.

In FIG. 1, the example query 10 has six elements on two levels. The six elements are flight 12, airline 14, date 16, origin 18, destination 20, and price 22. The top level (i.e., level 1) of the example query contains only element 12. Element 12 is also called a tag, and has a corresponding closing tag 24. If the query were formulated in a language other than a markup language, the query need not include tags and, in fact, need not include multiple levels. In the illustration, however, the lower level (i.e., level 2) of the query contains elements 14, 16, 18, 20, and 22, in that order.

This example query would assist a user in finding a web service that will allow the user to send a query which includes an airline, a date of travel, and the origin and destination cities, and which would return to the user the price of such a flight. For example, the user could send an actual query with the same elements as in the example query. The actual query could include a specific airline as in element 14 ("Acme Airlines"), a specific date as in element 16 ("12-24-2004"), a specific origin airport code as in element 18 ("BOS"), and a specific destination airport code as in element 20 ("LAX"). These specific inputs (Acme Airlines, BOS, LAX, etc.) are called the value of each element. A web service which exactly matched the actual query might return a price corresponding to a flight matching those specific values.

It should be appreciated, however, that there may not be a web service available which exactly matches the example query. In such a situation, the available web services will not provide the requested information or action when an actual query is sent. Thus, the present invention may be used to compare the schema employed by the available web services to the example query and to quantify the differences. This allows the user to select an available web service that, while not an exact match for the example query, is close enough that it may provide the needed information or action if the actual query is appropriately modified to match the schema of the available web service.

Figure 2:
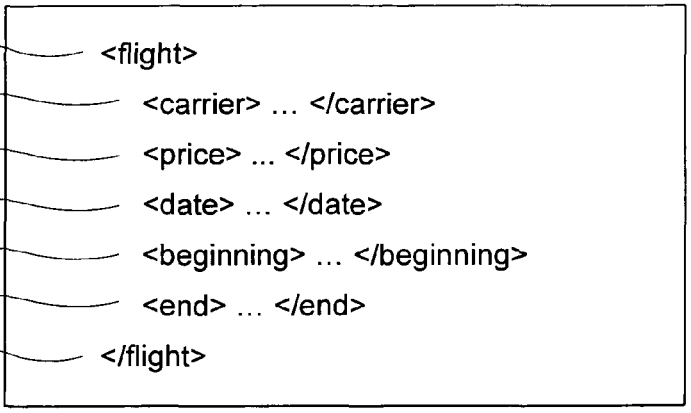
FIG. 2 is an illustration of a schema of a web service to be compared to the example query.
Figure 3:
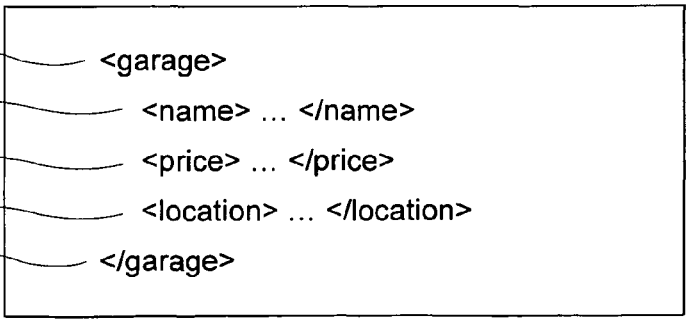
FIG. 3 is an illustration of another schema of a web service to be compared to the example query.

FIGS. 2 and 3 are illustrations of exemplary schemas of available web services which the system and method of the present invention may compare to the example query 10. Web service 26 in FIG. 2 is an illustration of a web service which provides information on airline flights. Web service 26 has six elements, ordered as follows: flight 28, carrier 30, price 32, date 34, beginning 36, and end 38. Web service 26 also has two levels, with element 28 being in the top level (i.e., level 1), and the other elements in the lower level (i.e., level 2). Flight 28 is also called a tag, and flight 40 is called a closing tag. It should be readily apparent that web service 26 is not identical to example query 10 as the names of some of the elements differ. It should also be apparent, however, that a person comparing example query 10 and web service 26 would notice many similarities, and might presume that web service 26 could provide the required information since they contain the same elements in substance, albeit differently named in some instances. The systems, methods, and computer program product of the present invention replicate this human ability to detect similarities between an example query and an available web service, thereby permitting a user to obtain the benefit of web service 26 even though the user does not know the schema employed by web service 26.

Web service 42 in FIG. 3 is an illustration of a schema of a web service which provides information on parking garages. Web service 42 has four elements: garage 44, name 46, price 48, and location 50. Web service 42 has two levels, with element 44 being in the top level (i.e., level 1), and the other elements in the lower level (i.e., level 2). Garage 44 is also called a tag, and garage 52 is called a closing tag. It should be readily apparent that web service 42 is not identical to example query 10, and in fact is quite different. A person comparing example query 10 and web service 42 would recognize the significant difference between the two and might presume that web service 42 would likely not provide the required information. The systems, methods, and computer program product of the present invention replicate this human ability to detect large differences between an example query and an available web service and, accordingly, do not rely upon web service 42 to provide the desired information.

Figure 4A:
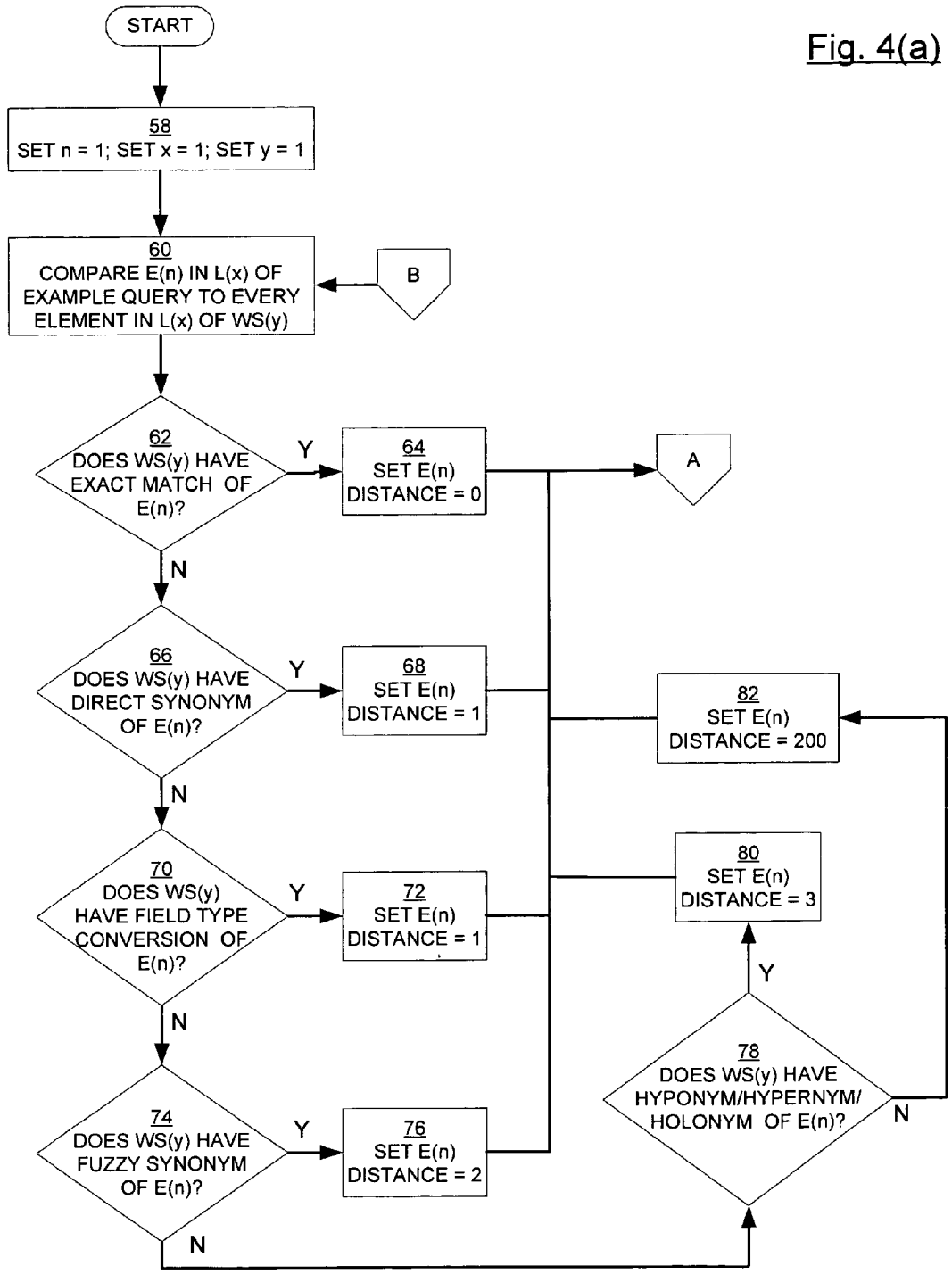
FIG. 4(a) is a flowchart of the operation of comparing the schema of a web service to an example query, according to one embodiment of the present invention.
Figure 4B:
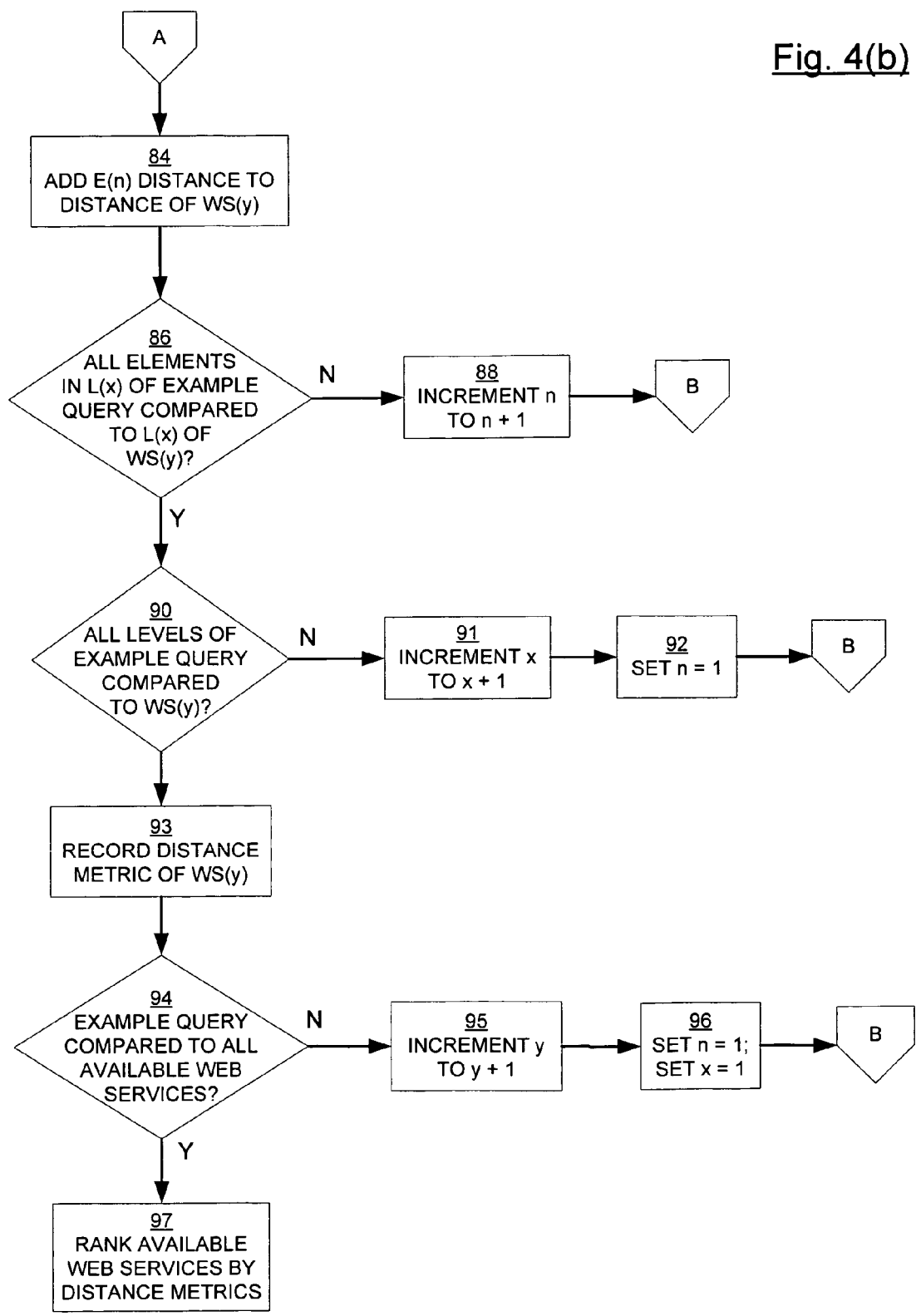
FIG. 4(b) is a continuation of the flowchart of FIG. 4(a), illustrating the operation of comparing the schema of a web service to an example query, according to one embodiment of the present invention.

FIG. 4(a) and FIG. 4(b) is a flowchart of the operation of comparing a web service to an example query, according to one embodiment of the present invention. Prior to the comparison that is illustrated in FIGS. 4(a) and 4(b), three steps are generally performed. These steps may be performed each time a web service needs to be queried, or they may be performed one time for use with a plurality of subsequent queries. First, an example query, such as is shown in FIG. 1, must be created to illustrate the specifics of the web service that the user is trying to locate. The web service consumer creates the example query by typing the tags, elements, and values desired, with any required levels, in the format required in an XML query, as illustrated in FIG. 1. Alternatively, the systems, methods, and computer program product of the present invention may allow the web service consumer to input only the names of the tags and elements, along with the values of each element and which level, if more than one, each element is on, and the example query would be automatically created in the appropriate format. Second, available web services must be identified, along with their schemas, which may be compared with the example query. Available web services may be identified using known registries, such as UDDI. In one embodiment, all identified web services are compared to the example query. This would result in a comprehensive comparison, however it may require significant time and resources. In another embodiment, preliminary screening techniques may be used to reduce the number of available web services which are compared to the example query, which could reduce the time and resources necessary to locate matching web services. For example, preliminary screening of available web services may be accomplished by scanning compressed or subset information, such as the number of fields, field names, or structure. Such a technique would quickly identify those available web services which are unlikely to be a match and therefore need not be compared in detail. Other techniques for reducing the number of available web services for comparison, as will be known to those skilled in the art, may be used. As mentioned above, FIGS. 2 and 3 illustrate available web services that may be compared to the example query. Third, the measures by which the exemplary query and the available web services will be compared are defined. In the following example, the elements of the exemplary query and the available web services are compared to determine if the elements are direct synonyms, field type conversions, fuzzy synonyms, hyponyms, hypernyms, or holonyms. Thus, direct synonyms, field type conversions, fuzzy synonyms, hyponyms, hypernyms, and holomyms must be identified for each element in the example query. A synonym is word having the same meaning as a given word. A field type conversion is a closely related word, but is expressed in a different format. For example, integer versus floating point number, GIF image format versus JPG image format, metric unit versus English/imperial unit, or English language versus Spanish language. A hyponym is a word that relates to the same topic, but is more specific than a given word. For example, armchair is a hyponym of chair. A hypernym is a word that relates to the same topic, but is more generic than a given word. For example, seat is a hypernym of chair. A holonym is a word that relates to the same topic, but names the whole of which a given word is a part. For example, hat is a holonym of brim. A fuzzy synonym is a related word or words that may not meet the definition of synomym, hyponym, hypernyn, or holonym, but which may encompass a relationship that is close enough to consider the web service that contains the fuzzy synonym. What types of relationships may be considered fuzzy synonyms may depend upon the particular embodiment of the invention. In one embodiment, fuzzy synonyms may comprise abbreviations, acronyms, and compound words. Direct synonyms, hyponyms, and hypernyms may be identified by using a lexical database, such as the WordNet® database. (WordNet is a registered trademark of Princeton University.) In this embodiment, each element of the example query is input to the WordNet database, and direct synonyms, hyponyms, and hypernyms are output. The identification of fuzzy synonyms will typically depend on the types of fuzzy synonyms used. For example, if the fuzzy synonym is an acronym or abbreviation, the acronym or abbreviation may be identified using an online tool such as Acronym Finder®. (Acronym Finder is a registered trademark of Mountain Data Systems.) The direct synonyms, fuzzy synonyms, hyponyms, hypernyms, and holonyms may be identified in other manners, such as by the user or by reference to other database or the like.

After an example query has been created and available web services have been identified, the example query is compared, one element at a time and one level at a time, to the elements of the schema of the available web services and the difference between the example query and each available web service is determined, such as by being quantified as a distance metric. One embodiment of this comparison and quantification of the present invention is illustrated in FIG. 4.

The flowchart of FIG. 4(a) and FIG. 4(b) illustrates the comparison of an example query having n elements, with the elements designated element 1, 2, . . . n, on each of x levels, with the levels designated level 1, 2, . . . x, to the elements of one or more web services, with the web services designated web service 1, 2, . . . y. For purposes of this flowchart, element n is indicated as E(n), level x is indicated as L(x), and web service y is indicated as WS(y). As shown in step 58 of FIG. 4(a), n is set to 1, x is set to 1, and y is set to 1, so that element 1 on level 1 is compared to web service 1. As shown in step 60, the first element in the example query, element n=1, on the first level of the example query, level x=1, is compared to every element in the first level of the first available web service, web service y=1. In one embodiment of the invention, this comparison involves looking for exact matches, direct synonyms, field type conversions, fuzzy synonyms (e.g., abbreviations, acronyms, or compound words), hyponyms, hypernyms, and holonyms of element 1 in web service 1. As noted above, different measures of comparison may be employed in other embodiments if so desired.

After comparing element 1 of level 1 to every element in level 1 of web service 1, a distance metric is determined for element 1 which quantifies how closely an element in web service 1 matches element 1. This determination of the distance metric is illustrated in steps 62 through 82. In step 62, it is determined if level 1 of web service 1 contains an element that is an exact match of element 1 of level 1 of the example query. If so, in step 64 the distance metric for element 1 is set to zero. If not, the next step 66 is to determine if level 1 of web service 1 contains an element that is a direct synonym of element 1. As mentioned above, direct synonyms of element 1 have previously been identified, such as by using a lexical database. If level 1 of web service 1 does contain a direct synonym of element 1, in step 68 the distance metric for element 1 is set to one. If not, the next step 70 is to determine if level 1 of web service 1 contains an element that is a field type conversion of element 1. If so, in step 72 the distance metric for element 1 is set to one. If not, the next step 74 is to determine if level 1 of web service 1 contains an element that is a fuzzy synonym of element 1. As mentioned above, fuzzy synonyms of element 1 have previously been identified, such as by using an online tool such as Acronym Finder. If level 1 of web service 1 does contain a fuzzy synonym of element 1, in step 76 the distance metric for element 1 is set to two. If not, the next step 78 is to determine if level 1 of web service 1 contains an element that is a hyponym, hypernym, or holonym of element 1. As mentioned above, hyponyms, hypernyms, and holonyms of element 1 have previously been identified, such as by using a lexical database. If level 1 of web service 1 does contain a hyponym, hypernym, or holonym of element 1, in step 80 the distance metric for element 1 is set to three. If not, then element 1 has no corresponding element in level 1 of web service 1. This lack of a corresponding element is called "no match," and results in the distance metric for element 1 being set to a large number, for example 200 in step 82.

The distance metrics used in FIG. 4(a) (zero for exact match, one for direct synonym, etc.) are for illustrative purposes only. It should be appreciated that different values may be used for different embodiments of the present invention since such distance metrics effectively weight the relatedness value of the different distance measures.

The flowchart now continues in FIG. 4(b). After element 1 of level 1 of the example query has been compared to all elements in level 1 of web service 1, in step 84 of FIG. 4(b) the distance metric of element 1 is added to a total distance metric for web service 1. As such, a running total of the distance metric of web service 1 is determined as each element of the example query is compared. After the distance metric of element 1 of level 1 is added to a distance metric for web service 1, in step 86 it is determined if all elements in level 1 of the example query have been compared to level 1 of web service 1. If not, element n is incremented to element 2 of level 1 in step 88, and the flowchart returns to FIG. 4(a) where element 2 of level 1 is compared to every element in level 1 of web service 1 and a distance metric is determined for element 2 of level 1, as discussed in detail above involving steps 60 through 82. After element 2 of level 1 has been compared to all elements in level 1 of web service 1, step 86 is again performed and it is determined if all elements in level 1 of the example query have now been compared to level 1 of web service 1. If not, element n is incremented to element 3 of level 1, and element 3 of level 1 is compared to every element in level 1 of web service 1 and a distance metric is determined for element 3 of level 1 in the same fashion. This process continues until all elements in level 1 of the example query have been compared to the elements in level 1 of web service 1, as determined in step 86.

Once all elements of level 1 of the example query has been compared to the elements in level 1 of web service 1, it is determined in step 90 if all levels of the example query have been compared to the corresponding level of web service 1. If not, level x is incremented to level 2 in step 91, element n is set back to element 1, and the flowchart returns to FIG. 4(a) where element 1 of level 2 of the example query is compared to level 2 of web service 1 as discussed in detail above involving steps 60 through 82. After element 1 of level 2 has been compared to level 2 of web service 1, this process continues until all elements of level 2 have been compared to level 2 of web service 1. After all elements of level 2 have been compared to level 2 of web service 1, this process continues until all elements in all levels of the example query have been compared to all levels of web service 1.

Where the example query has more levels than the web service to which the example query is being compared, all of the elements in the levels of the example query for which there is no corresponding level in the web service will typically be considered to have no match and therefore will each be assigned a distance metric of 200. For example, if the example query has three levels and web service 1 has two levels, then each element in level 3 of the example query will be assigned a distance metric of 200.

Once all elements in all levels of the example query have been compared to web service 1, the distance metric for web service 1, for which a running total had been determined in step 84, is recorded in step 93 for later ranking against the distance metric of other web services. This distance metric is a numerical representation of the difference between the example query and web service 1.

In step 94 it is then determined if the example query has been compared to all available web services. If not, web service y is incremented to web service 2 in step 95, element n is set back to element 1 and level x is set back to level 1 in step 96, and the example query is compared, element by element and level by level, to every element in every level of web service 2, as discussed in detail above. Once all elements in all levels of the example query have been compared to the elements of web service 2, a distance metric is recorded for web service 2 in step 93. Step 94 is again performed and it is determined if the example query has now been compared to all available web services. If not, web service y is incremented to web service 3, in step 95, and steps 60 through 93 are performed again.

Once it has been determined in step 94 that the example query has been compared against all available web services, the distance metric for all available web services (1, 2, ... y) are ranked in step 97. The web services are ranked based upon their respective distance metrics with the web service having the lowest distance metric being ranked number one, the web service with the next lowest distance metric being ranked number two, and so on until all web services are ranked.

In one embodiment of the invention, a complete distance metric is not necessarily calculated for all available web services. The present invention may keep track of the smallest web service distance metric determined at any point and which web service corresponds to that smallest distance metric. As the distance metric is being calculated for each remaining web service, the present invention keeps a running total of the distance metric for each element as they are determined, as shown in step 84 of FIG. 4(b). The calculation of the distance metric for a particular web service may be terminated once the running total of the distance metrics exceeds that of the shortest web service distance metric determined so far. The complete distance metric of a particular web service need not be calculated once it is determined that its distance metric is greater than the smallest one determined so far. This embodiment is not illustrated in the flowchart of FIG. 4(a) and FIG. 4(b).

This ranking provides information to the user of the present invention, such that the user knows that the web service ranked number one is the closest match to the example query and is most likely to be able to provide the needed information to the user. The raw value of the distance metric for each web service also provides information to the user. These raw distance metrics tell the user how closely each web service matches the example query. For example, a web service that has a distance metric of zero or one is a very close match to the example query and is likely to be able to provide the needed information to the user. A web service that has a distance metric of 400, for example, is unlikely to be able to provide the needed information to the user, even if it is ranked number one.

According to one aspect of the present invention, all or a portion of the system of the present invention generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 4(a) and FIG. 4(b) is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Figure 5:
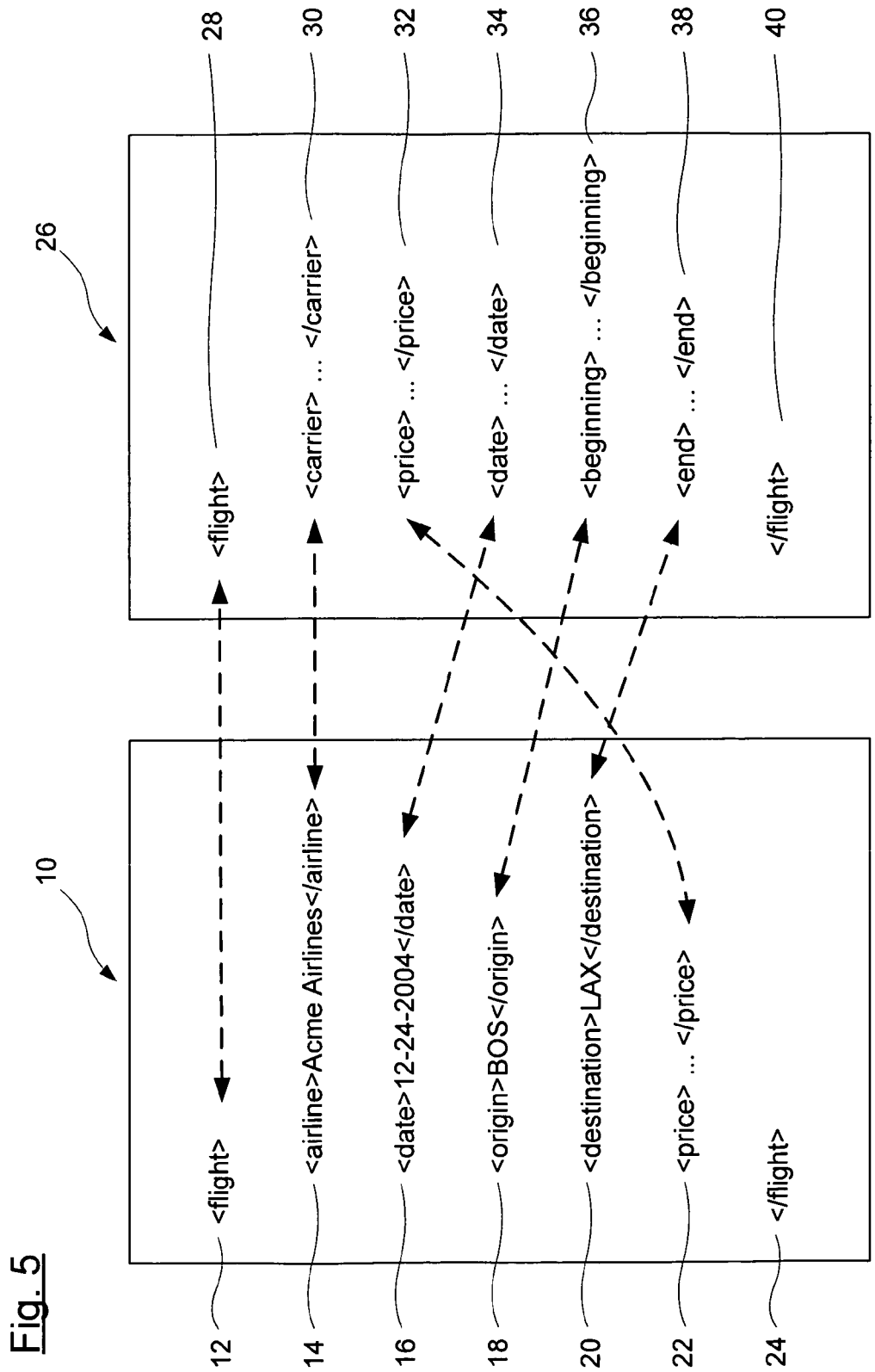
FIG. 5 is an illustration of a comparison of a schema of a web service to an example query, according to one embodiment of the present invention.

FIG. 5 is an illustration of a comparison of web service 26 to example query 10. Element 12 of example query 10 is "flight." When this element, which is on level 1 of the example query, is compared to each element in level 1 of web service 26 a direct match is found, that is element 28 "flight." Therefore, the distance metric for element 12 is zero. Having now compared the only element in level 1 of example query 10, level 2 is now examined and compared to level 2 of web service 26. As the closing tag 24 is generally identical to the tag, as it is in this example, the closing tag can generally be excluded from the comparison. The remaining elements to be compared are all on level 2 of example query 10, and will therefore be compared to elements on level 2 of web service 26. Element 14 of example query 10 is "airline." When this element is compared to each element in level 2 of web service 26 a hypernym is found, that is element 30 "carrier." Carrier is a hypernym of airline, in that airline is directed to the same subject matter but is more specific than carrier. Therefore, the distance metric for element 14 is three. Element 16 of example query 10 is "date." When this element is compared to each element in level 2 of web service 26 a direct match is found, that is element 34 "date." It should be noted that the relative order of an element within a web service compared to the relative order of an element within the example query does not matter. Therefore, the distance metric for element 16 is zero. Element 18 of example query 10 is "origin." When this element is compared to each element in level 2 of web service 26 a synonym is found, that is element 36 "beginning." Therefore, the distance metric for element 18 is one. Element 20 of example query 10 is "destination." When this element is compared to each element in level 2 of web service 26 a synonym is found, that is element 38 "end." Therefore, the distance metric for element 20 is one. Element 22 of example query 10 is "price." When this element is compared to each element in level 2 of web service 26 a direct match is found, that is element 32 "price." Note again that the relative order of the elements does not matter. Therefore, the distance metric for element 22 is zero.

Now that a distance metric has been determined for each element of example query 10, all of these distance metrics are summed to determine the distance between example query 10 and web service 26. The distance metrics for the elements of the exemplary query 10 are: zero for element 12, three for element 14, zero for element 16, one for element 18, one for element 20, and zero for element 22. The sum of these distance metrics is five, therefore five is a numerical representation of the difference between example query 10 and web service 26. Five is a relatively low number, therefore web service 26 is a relatively close match to example query 10.

Figure 6:
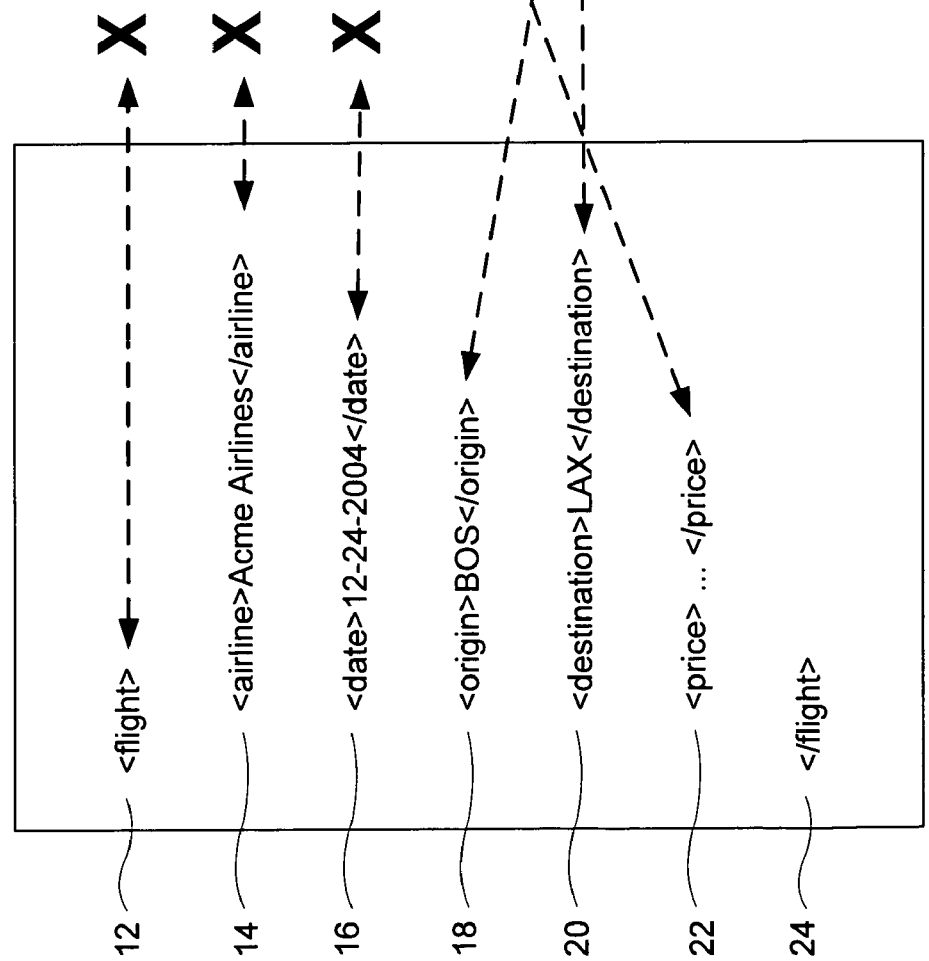
FIG. 6 is an illustration of a comparison of a schema of a web service to an example query, according to one embodiment of the present invention.

FIG. 6 is an illustration of a comparison of web service 42 to example query 10. Element 12 of example query 10 is "flight." When this element, which is on level 1 of example query 10, is compared to each element in level 1 of web service 42, no match is found. There is no element in web service 42 that is an exact match, a synonym, a field type conversion, a fuzzy synonym, a hyponym, a hypernym, or a holonym of element 12. Therefore, the distance metric for element 12 is 200. Having now compared the only element in level 1 of example query 10, level 2 is now examined and compared to level 2 of web service 42. Again, closing tag 24 can be excluded from the comparison. The remaining elements to be compared are all on level 2 of example query 10, and will therefore be compared to elements on level 2 of web service 42. Element 14 of example query 10 is "airline." When this element is compared to each element in level 2 of web service 42, no match is found. Therefore, the distance metric for element 14 is 200. Element 16 of example query 10 is "date." When this element is compared to each element in level 2 of web service 42, no match is found. Therefore, the distance metric for element 16 is 200. Element 18 of example query 10 is "origin." When this element is compared to each element in level 2 of web service 42 a hyponym is found, that is element 50 "location." Therefore, the distance metric for element 18 is three. Element 20 of example query 10 is "destination." When this element is compared to each element in level 2 of web service 42 a hyponym is found, that is element 50 "location."

Note, however, that element 50 was already matched to element 18. As this situation illustrates, an element that is already matched continues to be compared with other elements to determine if the previously matched element matches another element even better. In this regard, one element in the web service cannot be matched to more than one element in the example query. In a situation such as this, the closer of the relationships is used. For example, if one relationship is a direct synonym and one relationship is a hyponym, then the direct synonym relationship is used to calculate the distance metric. The other relationship, i.e., the less close or further relationship, is not considered, and the element of the example query that had previously matched to element 50 is again compared to the elements of the web service to see if the element can be matched to a different element in the web service. If there is no other match possible, then the element of the example query that had previously been matched to element 50 is considered not matched and a distance metric of 200 is assigned.

If, as is the situation here, both relationships are equally close, then there are two options. Both elements of the example query are compared to the other elements of the web service. The element of the example query that matches most closely to another element of the web service is associated with that other element even if it is a more distant relationship. If the two elements in the example query can only match to the same one element in the web service, however, then the first element in the example query to match is used, and the second element is considered to have no match. In the example of FIG. 6, both element 18 and element 20 of example query 10 match element 50 of web service 42. Both relationships are equally close. Neither element 18 nor element 20 can match any other element of web service 42 other than element 50. Therefore, the distance metric for element 18 is three based on its relationship to element 50, and the distance metric for element 20 is 200 based on it not having a match in web service 42.

Element 22 of example query 10 is "price." When this element is compared to each element in level 2 of web service 42 a direct match is found, that is element 48 "price." Note again that the relative order of the elements does not matter. Therefore, the distance metric for element 22 is zero.

Now that a distance metric has been determined for each element of example query 10, all of these distance metrics are summed to determine the distance between example query 10 and web service 42. The distance metrics for each element are: 200 for element 12, 200 for element 14, 200 for element 16, three for element 18, 200 for element 20, and zero for element 22. The sum of these distance metrics is 803, therefore 803 is a numerical representation of the difference between example query 10 and web service 42. This distance metric of 803 is a high number, therefore web service 42 is not a close match to example query 10.

Now that the distance metric of web service 26 has been determined (five) and the distance metric of web service 42 determined (803), a user of the present invention (i.e. a web service consumer) can see that web service 26 is much more likely to provide the needed information. The web service consumer can look at web service 26 and determine that its elements will provide the information needed if example query 10 is rewritten to use the same corresponding element names (i.e. to use the same schema) as web service 26. The web service consumer can rewrite example query 10 by manually changing element 14 to "carrier," changing element 18 to "beginning," and changing element 20 to "end." Making these changes will cause web service 26 to provide the requested information in response to a query.

In one embodiment of the invention, the example query may be automatically rewritten to match the schema used by the web service that is the closest match. In the example above, element 14 would be automatically changed to "carrier," element 18 automatically changed to "beginning," and element 20 automatically changed to "end." In this embodiment, a web service consumer would create an example query illustrating the web service desired, and the systems, methods, and computer program product of the present invention would find the closest matching web service and rewrite the example query without user intervention.

In certain embodiments of the invention, the example query is automatically rewritten only if the chosen web service is the closest match to the example query, and the comparison between the example query and the chosen web service yields only exact matches or direct synonyms. In the example above, example query 10 would not be automatically rewritten to match web service 26. Even though web service 26 is a close match to example query 10, the comparison yielded relationships that are more distant than direct synonyms (e.g. element 30 is a hypernym of element 14). Therefore, web service 26 is not a close enough match to utilize automatic rewriting of the example query.

Figure 7:
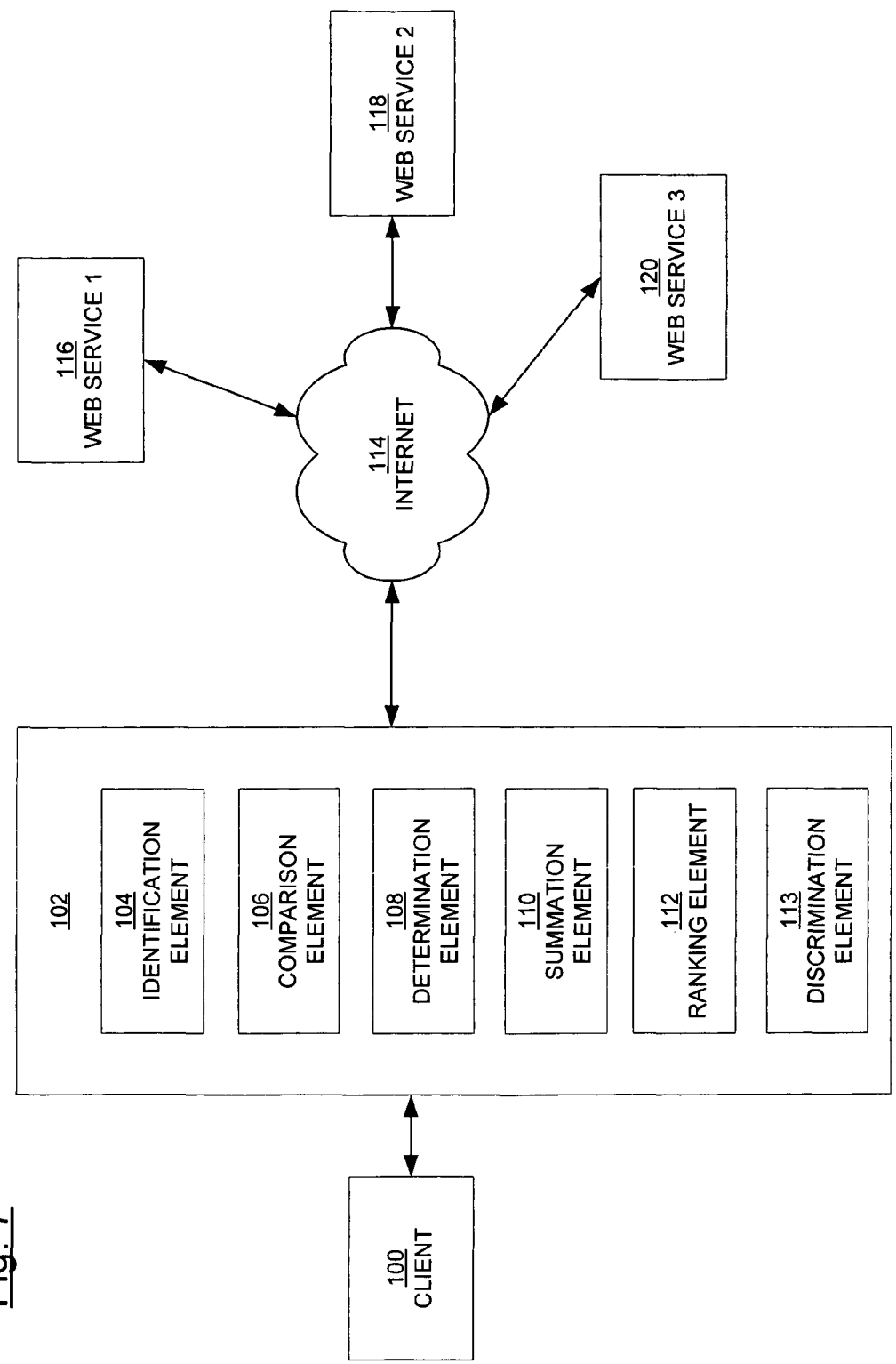
FIG. 7 is a schematic block diagram of a system for finding web services, according to one embodiment of the present invention.

FIG. 7 is a schematic block diagram of a system for finding web services, according to one embodiment of the present invention. FIG. 7 illustrates a system using a client/server configuration. A user of the system interfaces with the system via a client 100, which may be a personal computer or a terminal, for example. The client 100 communicates with the server 102. The server 102 interfaces with a network, such as the Internet 114. Web services, such as web service 1 (116), web service 2 (118), and web service 3 (120) also interface with the Internet 114. By interfacing with the Internet 114, server 102 is able to locate web services which may be compared to an example query.

In one embodiment of the present invention, server 102 may contain a number of different elements to allow an example query to be compared to web services. Server 102 may contain an identification element 104 for identifying web services, such as 116, 118, and 120. Server 102 may contain a comparison element 106 for comparing the example query of the desired web service to the elements of the available web services. The comparison element 106 may identify synonyms, field type conversions, fuzzy synonyms, hyponyms, hypernyms, and holonyms for each of the elements of the example query using a lexical database, as discussed above. The comparison element 106 may assign distance metrics to quantify the differences between the elements of the example query and the elements of the available web services. Server 102 may contain a determination element 108 for determining a relationship between the example query and the web service based on the distance metrics assigned in the comparison element 106. Server 102 may contain a summation element 110 for summing the distance metrics. Server 102 may contain a ranking element 112 to assign a rank to each of the web services based on their respective distance metrics. Server 102 may contain a discrimination element 113 that eliminates any web services where the respective sum of the distance metrics is greater than a predefined threshold.

In another embodiment of the invention, the server 102 may contain an element to automatically rewrite the example query to match the schema of the closest web service, although this element is not shown in FIG. 7.

While FIG. 7 illustrates a system of the present invention using a client/server configuration, it should be appreciated that the client/server configuration is shown for example purposes only and that they system of the present invention could utilize configurations other than client/server.

While embodiments of the present invention are described using example queries written in XML, it should be appreciated that this invention could be used with computer programming languages other than XML. It should also be appreciated that this invention need not be limited to locating web services. The system, method, and computer program product of the present invention may by used with Common Object Request Broker Architecture (CORBA), Java Remote Method Invocation (RMMI), Microsoft's Distributed Component Model (DCOM), and Electronic Data Interchange for Administration, Commerce, and Transport (EDIFACT).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of finding a desired web service comprising:
   receiving an example query of the desired web service, the example query comprising a plurality of elements;
   identifying a web service, the web service comprising a plurality of elements;
   comparing each of the plurality of elements of the example query to the plurality of elements of the web service;
   assigning a plurality of distance metrics to quantify a lexical relationship between each of the plurality of elements of the example query and the plurality of elements of the web service at a server device;
   wherein assigning comprises assigning at least one of:
   a value for an exact match that is lower than a value for a direct synonym, field type conversion, fuzzy synonym, hyponym, hypernym, holonym, and no match;
   a value for a direct synonym that is lower than a value for a field type conversion, fuzzy synonym, hyponym, hypernym, holonym, and no match;
   a value for a field type conversion that is lower than a value for a fuzzy synonym, hyponym, hypernym, holonym, and no match;
   a value for a fuzzy synonym that is lower than a value for a hyponym, hypernym, holonym, and no match; or
   a value for a hyponym, hypernym, or holonym that is lower than a value for no match;
   determining a relatedness between the example query and the web service based on the comparison and the plurality of distance metrics; and
   providing information regarding the relatedness between the example query and the web service with the server device to a client device.

2. The method of claim 1, further comprising summing the plurality of distance metrics, wherein the sum is indicative of the relatedness between the example query and the web service.

3. The method of claim 1, wherein the step of assigning a plurality of distance metrics comprises determining a lexical relationship between each of the plurality of elements of the example query and the plurality of elements of the web service and assigning the distance metric based on the lexical relationship.

4. The method of claim 3, wherein the lexical relationship is selected from the group consisting of exact match, direct synonym, field type conversion, fuzzy synonym, hyponym, hypernym, holonym, and no match.

5. The method of claim 4, further comprising identifying synonyms, hyponyms, hypernyms, and holonyms for each of the plurality of elements of the example query using a lexical database.

6. The method of claim 3, further comprising:
   identifying a plurality of web services, the plurality of web services each comprising a plurality of elements;
   comparing each of the plurality of elements of the example query to the plurality of elements of the plurality of web services;
   assigning a plurality of distance metrics to quantify a lexical relationship between each of the plurality of elements of the example query and the plurality of elements of the plurality of web services;
   determining a relatedness between the example query and the plurality of web services based on the comparison and the plurality of distance metrics and
   providing information regarding the relatedness between the example query and the plurality of web services.

7. The method of claim 6, further comprising summing the plurality of distance metrics for each of the plurality of web services.

8. The method of claim 7, further comprising assigning a rank to each of the plurality of web services based on the relatedness of the plurality of web services to the example query.

9. The method of claim 7, further comprising eliminating any of the plurality of web services where the sum of the distance metrics is greater than a predefined threshold.

10. The method of claim 8, further comprising eliminating any of the plurality of web services having a rank that is above a predefined threshold.

11. The method of claim 1, wherein assigning comprises assigning a value that is indicative of a lexical relatedness between each of the plurality of elements of the example query and the plurality of elements of the web service.

12. The method of claim 11, wherein comparing comprises:
    determining whether there is an exact match between each of the plurality of elements of the example query and the plurality of elements of the web service;
    if there is no exact match, determining whether there is a direct synonym between each of the plurality of elements of the example query and the plurality of elements of the web service;
    if there is no direct synonym, determining whether there is a field type conversion between each of the plurality of elements of the example query and the plurality of elements of the web service;
    if there is no field type conversion, determining whether there is a fuzzy synonym between each of the plurality of elements of the example query and the plurality of elements of the web service; and
    if there is no fuzzy synonym, determining whether there is a hyponym, hypernym, or holonym between each of the plurality of elements of the example query and the plurality of elements of the web service.

13. The method of claim 1, wherein comparing comprises determining at least one of:
    whether there is a direct synonym between each of the plurality of elements of the example query and the plurality of elements of the web service;
    whether there is a field type conversion between each of the plurality of elements of the example query and the plurality of elements of the web service;
    whether there is a fuzzy synonym between each of the plurality of elements of the example query and the plurality of elements of the web service; or
    whether there is a hyponym, hypernym, or holonym between each of the plurality of elements of the example query and the plurality of elements of the web service.

14. A system for finding a desired web service comprising:
a processor comprising:
an identification element configured to identify a web service comprising a plurality of elements;
a comparison element configured to compare each of a plurality of elements of an example query of the desired web service to the plurality of elements of the web service and for assigning a plurality of distance metrics to quantify a lexical relationship between each of the plurality of elements of the example query and the plurality of elements of the web service;
wherein the comparison element is configured to assign at least one of:
a value for an exact match that is lower than a value for a direct synonym, field type conversion, fuzzy synonym, hyponym, hypernym, holonym, and no match;
a value for a direct synonym that is lower than a value for a field type conversion, fuzzy synonym, hyponym, hypernym, holonym, and no match;
a value for a field type conversion that is lower than a value for a fuzzy synonym, hyponym, hypernym, holonym, and no match;
a value for a fuzzy synonym that is lower than a value for a hyponym, hypernym, holonym, and no match; or
a value for a hyponym, hypernym, or holonym that is lower than a value for no match; and
a determination element configured to determine a relatedness between the example query and the web service based on the comparison and the plurality of distance metrics.

15. The system of claim 14, further comprising a summation element configured to sum the plurality of distance metrics, wherein the sum is indicative of the relatedness between the example query and the web service.

16. The system of claim 14, wherein the comparison element determines a lexical relationship between each of the plurality of elements of the example query and the plurality of elements of the web service and assigning the distance metric based on the relationship.

17. The system of claim 16, wherein the lexical relationship is selected from the group consisting of exact match, direct synonym, field type conversion, fuzzy synonym, hyponym, hypernym, holonym, and no match.

18. The system of claim 17, wherein the comparison element identifies synonyms, hyponyms, hypernyms, and holonyms for each of the plurality of elements of the example query using a lexical database.

19. The system of claim 16, wherein:
the identification element identifies a plurality of web services, the plurality of web services each comprising a plurality of elements;
the comparison element compares each of the plurality of elements of the example query of the web service desired to the plurality of elements of the plurality of web services and assigns a plurality of distance metrics to quantify a lexical relationship between each of the plurality of elements of the example query and the plurality of elements of the plurality of web services; and
the determination element determines a relatedness between the example query and the plurality of web services based on the comparison and the plurality of distance metrics.

20. The system of claim 19, wherein the summation element sums the plurality of distance metrics for each of the plurality of web services.

21. The system of claim 20, further comprising a ranking element to assign a rank to each of the plurality of web services based on the relatedness of the plurality of web services to the example query.

22. The system of claim 20, further comprising a discrimination element that eliminates any of the plurality of web services where the sum of the distance metrics is greater than a predefined threshold.

23. The system of claim 21, further comprising a discrimination element that eliminates any of the plurality of web services having a rank that is above a predefined threshold.

24. The system of claim 14, wherein the comparison element is configured to determine at least one of:
whether there is a direct synonym between each of the plurality of elements of the example query and the plurality of elements of the web service;
whether there is a field type conversion between each of the plurality of elements of the example query and the plurality of elements of the web service;
whether there is a fuzzy synonym between each of the plurality of elements of the example query and the plurality of elements of the web service; or
whether there is a hyponym, hypernym, or holonym between each of the plurality of elements of the example query and the plurality of elements of the web service.

25. A computer program product for finding a desired web services, the computer program product comprising at least one computer-readable storage medium having computer-readable program code portions stored therein for controlling a processor to perform a method for finding desired web services, the computer-readable program code portions comprising:
a first executable portion configured to identify a web service comprising a plurality of elements;
a second executable portion configured to compare each of a plurality of elements of an example query of the desired web service to the plurality of elements of the web service and assign a plurality of distance metrics to quantify a lexical relationship between each of the plurality of elements of the example query and the plurality of elements of the web service;
wherein the second executable portion is configured to assign at least one of:
a value for an exact match that is lower than a value for a direct synonym, field type conversion, fuzzy synonym, hyponym, hypernym, holonym, and no match:
a value for a direct synonym that is lower than a value for a field type conversion, fuzzy synonym, hyponym, hypernym, holonym, and no match;
a value for a field type conversion that is lower than a value for a fuzzy synonym, hyponym, hypernym, holonym, and no match;
a value for a fuzzy synonym that is lower than a value for a hyponym, hypernym, holonym, and no match; or
a value for a hyponym, hypernym, or holonym that is lower than a value for no match; and
a third executable portion configured to determine a relatedness between the example query and the web service based on the comparison and the plurality of distance metrics.

26. The computer program product of claim 25, further comprising a fourth executable portion configured to sum the plurality of distance metrics, wherein the sum is indicative of the relatedness between the example query and the web service.

27. The computer program product of claim 25, wherein the second executable portion assigns a plurality of distance metrics by determining a lexical relationship between each of the plurality of elements of the example query and the plurality of elements of the web service and assigning the distance metric based on the relationship.

28. The computer program product of claim 27, wherein the second executable portion selects the lexical relationship from the group consisting of exact match, direct synonym, field type conversion, fuzzy synonym, hyponym, hypernym, holonym, and no match.

29. The computer program product of claim 28, wherein the second executable portion is further configured to identify synonyms, hyponyms, hypernyms, and holonyms for each of the plurality of elements of the example query using a lexical database.

30. The computer program product of claim 27, wherein:
the first executable portion is configured to identify a plurality of web services, the plurality of web services each comprising a plurality of elements;
the second executable portion is configured to compare each of the plurality of elements of the example query to the plurality of elements of the plurality of web services and assigning a plurality of distance metrics to quantify a lexical relationship between each of the plurality of elements of the example query and the plurality of elements of the plurality of web services; and
the third executable portion is configured to determine a relatedness between the example query and the plurality of web services based on the comparison and the plurality of distance metrics.

31. The computer program product of claim 30, further comprising a fourth executable portion configured to sum the plurality of distance metrics for each of the plurality of web services.

32. The computer program product of claim 31, further comprising a fifth executable portion configured to assign a rank to each of the plurality of web services based on the relatedness of the plurality of web services to the example query.

33. The computer program product of claim 31, further comprising a fifth executable portion configured to eliminate any of the plurality of web services where the sum of the distance metrics is greater than a predefined threshold.

34. The computer program product of claim 32, further comprising a sixth executable portion configured to eliminate any of the plurality of web services having a rank above a predefined threshold.

35. The computer program product of claim 25, wherein the second executable portion is configured to determine at least one of:
whether there is a direct synonym between each of the plurality of elements of the example query and the plurality of elements of the web service;
whether there is a field type conversion between each of the plurality of elements of the example query and the plurality of elements of the web service;
whether there is a fuzzy synonym between each of the plurality of elements of the example query and the plurality of elements of the web service; or
whether there is a hyponym, hypernym, or holonym between each of the plurality of elements of the example query and the plurality of elements of the web service.

36. A method of finding a desired web service comprising:
receiving an example query of the desired web service, the example query comprising a plurality of elements;
identifying a web service, the web service comprising a plurality of elements;
comparing each of the plurality of elements of the example query to the plurality of elements of the web service;
assigning a plurality of distance metrics to quantify a lexical relatedness between each of the plurality of elements of the example query and the plurality of elements of the web service at a server device;
wherein assigning comprises assigning:
a value for an exact match that is lower than a value for a direct synonym, field type conversion, fuzzy synonym, hyponym, hypernym, holonym, and no match;
a value for a direct synonym that is lower than a value for a field type conversion, fuzzy synonym, hyponym, hypernym, holonym, and no match;
a value for a field type conversion that is lower than a value for a fuzzy synonym, hyponym, hypernym, holonym, and no match;
a value for a fuzzy synonym that is lower than a value for a hyponym, hypernym, holonym, and no match; and
a value for a hyponym, hypernym, or holonym that is lower than a value for no match; and
determining a relatedness between the example query and the web service based on the comparison and the plurality of distance metrics; and
providing information regarding the relatedness between the example query and the web service with the server device to a client device.

* * * * *